No. 773,633.                                                                         Patented November 1, 1904.

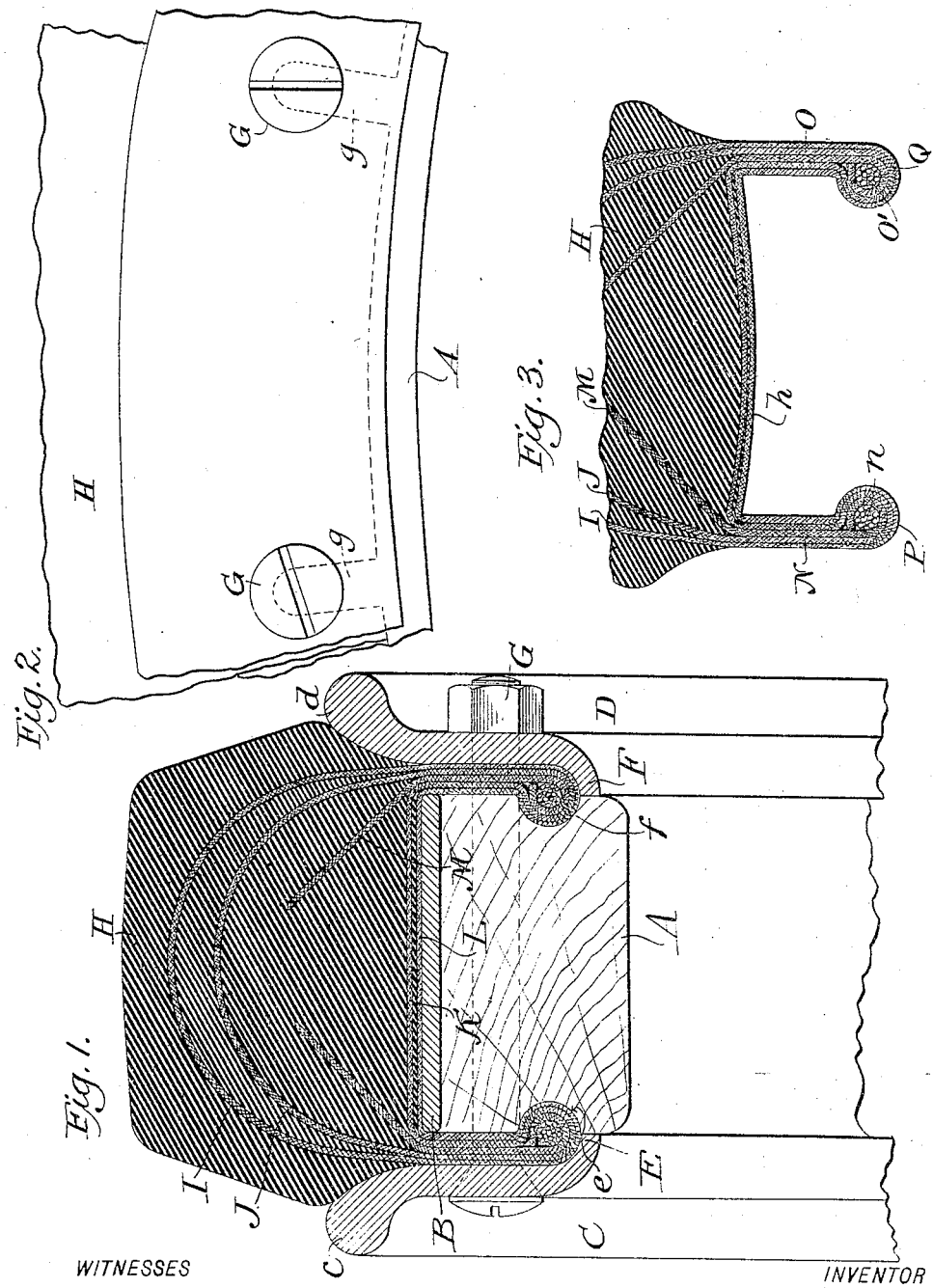

UNITED STATES PATENT OFFICE.

HENRY G. FISKE, OF NEW YORK, N. Y., ASSIGNOR, BY MESNE ASSIGNMENTS, TO MOTOR TRUST COMPANY, TRUSTEE, A CORPORATION OF NEW YORK.

SOLID ELASTIC TIRE WITH FASTENING-STRIPS.

SPECIFICATION forming part of Letters Patent No. 773,633, dated November 1, 1904.

Application filed July 1, 1899. Serial No. 722,525. (No model.)

*To all whom it may concern:*

Be it known that I, HENRY G. FISKE, a citizen of the United States of America, and a resident of the city of New York, county of New York, and State of New York, have invented certain new and useful Improvements in Solid Elastic Tires with Fastening-Strips, of which the following is a specification.

My invention relates to improvements in elastic tires for vehicle-wheels. (Type K.)

The present invention consists partly in providing an elastic tire with means for attaching it to a wheel. The means consists principally of fabric which is so incorporated with the elastic material of which the tire is composed as to greatly add to the tensile strength and wearing qualities thereof, and at the same time by parts extending from the tire it provides a means for attaching the same to the wheel in a manner which I believe to be entirely novel and know to be both useful and practicable, as will appear from the following description and the accompanying drawings, in which—

Figure 1 is a transverse sectional elevation of a tire embodying my invention. Fig. 2 is a side elevation of a part of the rim and tire. Fig. 3 is a portion of the tire separate from the rim.

In said drawings, A is a wooden felly, which is by preference used in this type of wheel, the same being provided with and strengthened by an exterior metal band B.

C D are laterally-detachable metallic flanges.
These flanges have outwardly-flaring edges *c d* and inwardly-turned lower edges E F, which fit against the sides of the felly A. The felly A is formed with grooves *e f*, one in each side, for receiving an extension from the tire, as will appear, and there exists a space between the edges E F of the flanges C D where they engage the felly and the parallel extending sides of the flanges, which spaces—both the grooves *e f*—are substantially parallel, only the upper or outer portions of the edges of the flanges C D flaring outwardly, as indicated. The flanges are held in position against the felly A by any desired number of transverse bolts G, and either of the flanges is removable upon withdrawing its retaining-bolts.

It will be seen that the general form of cross-section of the tire-body is trapezoidal, which gives a considerable bearing area of the tire on the ground and at the same time a large base area for contact with the felly. This disposition of the elastic material meets the great strains due to direct load and other effects involved in uses for which this tire is primarily intended.           

The description just given conforms to and is explanatory of what is shown in the drawings, and I have therein illustrated one good form and arrangement of the flanges with respect to the attaching-lugs depending from the tire; but such description is not to be construed as a limitation of my invention specifically thereto.

The tire H is a solid body of elastic material, such as rubber. This is preferably molded in a single endless piece, adapted both in size and in cross-section to the particular type of wheel to which it is to be applied, although I know no reason why it should not be made in sections and subsequently connected. With either form of construction several loops of strong fabric I J K L M are molded into the material. These loops only are shown, as they are deemed sufficient, but more or fewer may be used, as preferred. The fabric is distributed through the material of the tire H with a twofold object—that is to say, to increase its structural strength and to secure as firm a hold as possible. All of the layers of fabric are looped outwardly and downwardly at each side of the tire to form the depending fastening-strips N O, which strips lie against the sides of the felly A and are there clamped and held by the middle portions of the flanges C D. The lower edges of the fastening-strips may be folded over cords *n* O′, which at the same time cause desirable enlargement of the edges P Q of the said strips and fit into and are securely held by the side flanges C D in the recesses *e f*, formed in the sides of the felly A to receive them.

It is important that the base $h$ of the tire H be seated squarely and firmly upon the periphery of the felly A, and in order to assure this result the said base of the tire is constructed of somewhat rounding form, as indicated in Fig. 3, so that when placed upon the tire its central portion will first engage and when pressed down the other portions will be seated, placing them slightly under tension, which tension should be sufficient to absorb any slack or looseness which might otherwise exist.

Notches $g$ (indicated in dotted lines in Fig. 2) are cut in the edges of the fastening-strips in order to permit the tire to be taken off and removed from the wheel while the bolts G are still in position, so that the thickening-cords $n$ O′ would not in such instance be endless, merely acting to enlarge the edges, and thereby give stronger hold to said edges in the notches of the felly, yet permitting ready removal of the tire from the wheel.

Without limiting myself to the exact details of construction herein set forth, what I claim is—

1. The combination in a wheel, of a tire comprising a body of elastic material circumferentially substantially inexpansible on its base, fabric permanently embodied therein with layers thereof lining the seat of the tire-body, a tread portion substantially parallel with base, said tire-body being of greater width than thickness, lateral depending flaps composed completely of fabric with all other portions of said fabric permanently vulcanized with the tire-body, a felly proper, a band encircling said felly and forming a seat for said tire, lateral plates coöperating with said felly and with said lateral flaps coöperating to clamp said tire, said lateral plates bearing upon said felly on one edge and extending upwardly and outwardly forming a contracted opening whereby said tire proper is laterally secured and a seat portion with tapered sides is afforded for retaining said tire-body proper, substantially as and for the purpose described.

2. The combination in a wheel, of a felly proper, an encircling band presenting a transversely uniform seat, a tire comprising a solid body of elastic material, fabric permanently embodied therein and extending inwardly on the wheel beyond the elastic portion of the tire-body and forming lateral flaps, wires embodied in the extremities of said flaps, said fabric constituting loops therefor, and substantially parallel lateral flanges coöperating to secure said side flaps and also to support said tire-body, said flanges having at one edge a bearing upon the felly and forming therewith a parallel pocket for clamping said flap, all substantially as shown and described.

3. In a wheel, a tire portion comprising a substantially solid body of elastic material, a series of bands of fabric depending therefrom, consisting wholly of fabric, the other portions of which fabric extend contiguously into the main body portion of elastic material, a layer of fabric forming a base portion of said body and normally curved convexly toward the felly-tread, detachable parallel side flanges engaging the felly side and offering a broad parallel pocket for the bands, substantially as and for the purpose described.

4. In a wheel, a tire having a solid elastic body portion, fabric lining the seat of said tire, depending flaps consisting wholly of fabric, the contiguous portions of which enter and are integral with the body portion of said tire, lateral clamping-plates, bolts coöperating with said clamping-plates and felly, a felly proper, an encircling band, incisions in said lateral fabric flaps whereby a partial loosening of said lateral flanges permits the removal of the tire, substantially as and for the purpose described.

Signed by me at New York, N. Y., this 30th day of June, 1899.

HENRY G. FISKE.

Witnesses:
FRANKLAND JANNUS,
J. S. DE SELDING.